US007286257B1

(12) United States Patent
Morgavi

(10) Patent No.: US 7,286,257 B1
(45) Date of Patent: Oct. 23, 2007

(54) GRAPHIC PRINTING MACHINE FOR CARD-TYPE STORAGE MEDIUM, METHOD FOR PRINTING SAID STORAGE MEDIA AND STORAGE MEDIA

(75) Inventor: Paul Morgavi, La Ciotat (FR)

(73) Assignee: Gemplus, Gemenos Cedex (FR)

( * ) Notice: Subject to any disclaimer, the term of this patent is extended or adjusted under 35 U.S.C. 154(b) by 0 days.

(21) Appl. No.: 09/914,868

(22) PCT Filed: Feb. 21, 2000

(86) PCT No.: PCT/FR00/00454

§ 371 (c)(1), (2), (4) Date: Sep. 4, 2001

(87) PCT Pub. No.: WO00/51818

PCT Pub. Date: Sep. 8, 2000

(30) Foreign Application Priority Data

Mar. 1, 1999 (FR) .................................. 99 02515

(51) Int. Cl.
*G06F 15/00* (2006.01)
*G06F 3/12* (2006.01)

(52) U.S. Cl. ...................................... 358/1.18; 358/1.8

(58) Field of Classification Search .............. 358/1.18, 358/1.15, 1.1, 1.14, 1.5, 1.8, 1.12, 1.16, 1.17; 347/102, 101, 8, 14, 19, 104, 105; 219/216; 101/486

See application file for complete search history.

(56) References Cited

U.S. PATENT DOCUMENTS 4,070,497 A * 1/1978 Wismer et al. ............. 427/493
5,587,728 A * 12/1996 Edgar .......................... 347/19
5,657,111 A * 8/1997 Lo .............................. 355/22
5,724,437 A * 3/1998 Bucher et al. .............. 382/112
5,771,058 A * 6/1998 Kobayashi .................. 347/218
5,806,992 A * 9/1998 Ju .............................. 400/56
5,980,011 A * 11/1999 Cummins et al. .............. 347/4
6,086,107 A * 7/2000 Whistler et al. .............. 283/81
6,120,196 A * 9/2000 Matsuda ...................... 400/55
6,173,901 B1 * 1/2001 McCannel .................. 235/493
6,176,574 B1 * 1/2001 Wen et al. .................. 347/101
6,189,684 B1 * 2/2001 Greive ....................... 198/835
6,301,374 B1 * 10/2001 Stringa ....................... 382/112
6,306,929 B1 * 10/2001 Amon et al. ................ 523/160
6,335,978 B1 * 1/2002 Moscato et al. ............ 382/112
6,478,485 B1 * 11/2002 Niestrath ............... 400/120.07
6,694,884 B2 * 2/2004 Klinefelter et al. ......... 101/484

FOREIGN PATENT DOCUMENTS

EP 0298687 A2 1/1989
EP 0341524 A1 11/1989
EP 0519537 A1 12/1992
EP 0575772 A1 12/1993
EP 0663296 A1 7/1995

(Continued)

*Primary Examiner*—Gabriel Garcia
(74) *Attorney, Agent, or Firm*—Buchanan Ingersoll & Rooney PC

(57) ABSTRACT

A graphic printing machine and method for a card-type storage medium employs a jet printing head and a controller to perform ink jet printing on the medium. The invention is useful for printing plastic or cardboard or paper cards.

23 Claims, 3 Drawing Sheets

FOREIGN PATENT DOCUMENTS

| | | | |
|---|---|---|---|
| EP | 0771652 | A3 | 5/1997 |
| EP | 0778149 | A2 | 6/1997 |
| EP | 0798120 | A1 | 10/1997 |
| FR | 2764844 | A1 | 12/1998 |
| JP | 07230517 | | 12/1995 |
| WO | WO9851507 | | 11/1998 |

* cited by examiner

GRAPHIC PRINTING MACHINE FOR CARD-TYPE STORAGE MEDIUM, METHOD FOR PRINTING SAID STORAGE MEDIA AND STORAGE MEDIA

This disclosure is based upon, and claims priority from French Application No. 99/02515, filed on Mar. 1, 1999 and International Application No. PCT/FR00/00454, filed Feb. 21, 2000, which was published on Sep. 8, 2000 in a language other than English, the contents of which are incorporated herein by reference.

BACKGROUND OF THE INVENTION

The invention relates to a printing machine and method for a storage medium notably of plastic card type and the storage media printed according to the method.

It relates more particularly to a machine and method for graphic printing, notably colour and high-quality, for a storage medium.

Graphic printing means the production of surfaces having an aesthetic effect with a decorative or photographic design, etc. as opposed to the on-line printing of alphanumeric characters.

The invention applies to all card applications and in particular to plastic cards such as payment cards, credit cards, telephone cards, mobile telephone cards and authentication cards whether they are cards with a magnetic strip and/or storage cards.

Storage cards have an electronic micromodule containing an integrated circuit chip with contacts exposed on the surface or contactless, with one or more memories and most often a microprocessor or a magnetic strip.

The invention also applies to smart cards with contacts exposed on the surface or contactless or to cards with an electromagnetic antenna and/or with an integrated circuit chip.

In the remainder of this document, for simplification, the terms storage medium, smart card or plastic card will be used indiscriminately to designate a smart card and/or magnetic and/or electromagnetic type medium made of plastic or cardboard or paper.

The high-quality graphic printing market for media such as cards is today exclusively dominated by traditional technologies, these being offset printing, serigraphy or flexography.

These technologies, well adapted to mass production, are on the other hand not adapted to media which have surface level differences, notably the embossing on credit cards. Furthermore, they can damage the electronic circuits which might be contained by the card as a result of the pressure exerted on the media, notably as regards the offset printing technology. These technologies are not simple to use since they do not allow printing of different information from one medium to another presented in succession continuously on a printing line.

During the past few years, a new generation of electrophotographic equipment has appeared which makes it possible to modify, more or less simply, information to be printed "on the fly" (that is to say during operation of a printing line) by means of pre-designed computer programs. This equipment has the drawback of introducing electrostatic charges which could damage the electronic circuits contained in the medium.

It also has the drawback of exerting pressure on the medium as previously and requiring good surface flatness of the medium.

In addition, these solutions are only adapted to applications in which the media to be printed are in the form of rolls or sheets of large dimensions.

SUMMARY OF THE INVENTION

The present invention makes it possible to remedy these drawbacks.

It proposes a printing machine for a plastic card type medium using ink-jet technology.

The invention makes it possible to print, at industrial speeds, plastic cards of variable sizes and thicknesses liable to include elements such as an electronic micromodule, a magnetic strip, an electromagnetic antenna or some other element, which of course must not be printed, without the need to have a physical contact between the printing machine and the medium to be printed.

According to the invention, the machine makes it possible to have the capability of partially or entirely changing the information to be printed between two successive cards in the continuous printing line.

The printing machine according to the invention is able to print plastic media, which is most often the case of media such as smart cards, but also low-cost cards made of cardboard or paper.

One object of the present invention is therefore more particularly a printing machine for a card-type storage medium having at least one ink-jet head and means of controlling said head in order to implement ink-jet printing on said medium.

The media to be printed are plastic cards or cards made of cardboard or paper.

In the case of plastic cards, the ink or inks used are inks cross-linked by radiation.

The radiation used for the cross-linking is ultraviolet radiation.

In the case of cardboard or paper cards, the ink or inks used are preferably aqueous inks or phase-change inks or solvent-based inks.

In the case of storage cards, said machine has a reader able to read information contained in said storage cards, notably information useful to the control means and able to communicate said read information to said control means.

The read information, useful to the control means, corresponds to the information it is wished to print on the storage medium.

According to another characteristic, the machine has means of dynamic measurement of geometric and/or positioning parameters of a medium in order to communicate this measurement information to the control means.

The measurement means include a computer-aided vision device comprising a video camera.

According to another characteristic, the machine has means of checking the quality of the printing, disposed after the print head or heads, and able to communicate, to the control means, information relating to any fault detected.

According to another characteristic, the machine has a support element for receiving a plurality of card-type media to be printed continuously, said media to be printed being disposed on the support element so that the media to be printed travel past the head or heads of the machine.

In the case of printing in a single pass, the support element is a flat conveyor.

In the case of printing in a number of passes, the support element is a drum.

According to another characteristic, the machine has a suction device, the drum being perforated, so as to hold the media to be printed on the support element while it is moving.

According to another characteristic, the machine has a system for turning over the media to be printed for double-sided printing.

According to another characteristic, the machine has one or more print heads, these print heads being aligned along the direction of movement of the support element and facing said support element.

According to another characteristic, the machine has one or more colour print heads for printing images of the photographic or coloured type, and monochrome heads for marking.

According to another characteristic, the machine has means for converting the ink into gel during printing and means for cross-linking the ink at the end of printing.

The means for converting the ink into gel comprise an optical fibre placed after each print head, connected to a light radiation source.

The means for cross-linking the ink at the end of printing comprise an ultraviolet radiation lamp.

Another object of the invention concerns a method of graphic printing of a storage medium principally characterised in that the printing is performed by ink jet.

According to another characteristic, the method comprises a step of gelling of the surface of the drop of ink just after the impact of the drop on the medium and notably before passing to a new ink-jet head for the next printing.

The gelling is performed by UV radiation.

According to another characteristic, the printing is performed in accordance with geometric and/or positioning parameters extracted beforehand from each medium to be printed.

Although described for the card application, the medium printing method with extraction of geometric and/or positioning parameters can apply to any medium to be printed.

According to another characteristic, piezoelectric type ink-jet heads are used.

According to another characteristic, the method has a varnishing step carried out by ink jet.

Another object of the invention concerns a card-type storage medium having graphic printing carried out by ink jet.

In a variant, the card-type storage medium has a varnish produced by ink jet.

BRIEF DESCRIPTION OF THE DRAWINGS

Other features and advantages of the invention will emerge from a reading of the description produced hereinafter which is given as an illustrative but non-limitative example and with reference to the drawings in which.

DETAILED DESCRIPTION

Figure 1:
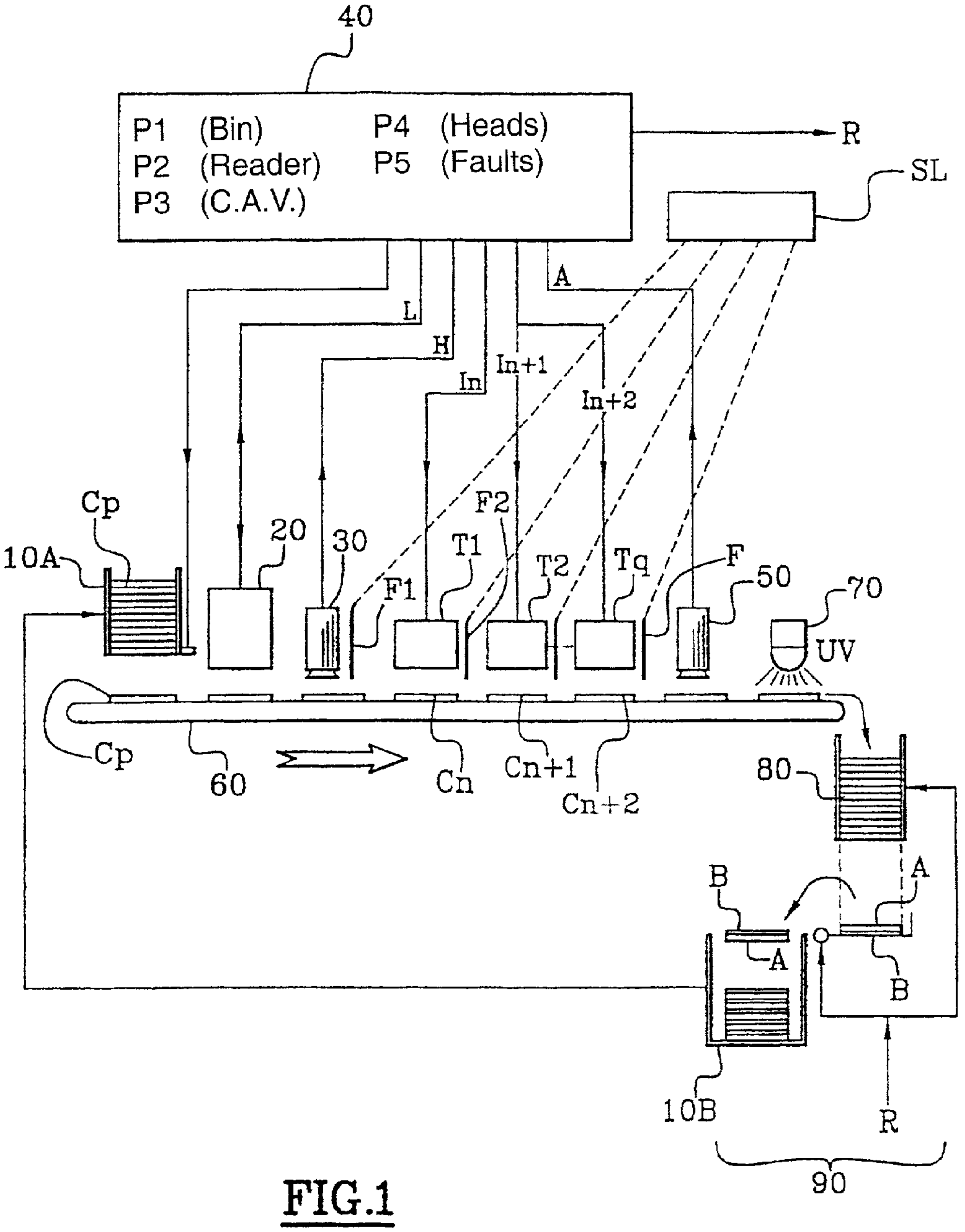
FIG. 1 depicts a general diagram of a printing machine according to the invention.

FIG. 1 depicts the case where the machine has a number of ink-jet print heads in particular, one head Tq making it possible to write for example text and the other heads $T_1$, $T_2$ making it possible to print in colour. Each head corresponds to a particular colour; the inks used in this example are inks cross-linked by UV.

Better results can be obtained by improving certain characteristics of the UV ink such as adhesion, cross-linking speed or viscosity in accordance with the nature of the medium.

The print heads are controlled by a control unit 40, which can be connected as has been said to a card reader 20 in the case where the card is a smart card and contains information relating to the design to be printed.

The control unit 40 is implemented by means of a microcomputer loaded with a printing program $P_4$ able to control the heads $T_1$-Tq for printing, either in a single pass or a number of passes, the cards in front of said heads. To that end, the unit also controls the movements of the support element 60.

A high-capacity feed bin type loader 10A has been placed at the input of the printing line in order to feed the cards Cp successively on to the conveyor at the desired rate. The feeding is controlled by the unit 40.

The reader 20 is placed just after this feed bin output and makes it possible to read the content L of the information present in the card whether the card is a smart card or a contactless card or a card with a magnetic strip. The information L issuing from this reading is transmitted to the control unit 40 of the machine which converts this electrical information into printable data for the heads.

After this operation, the card is next conveyed under a computer-aided vision device 40-30. This device comprises, besides the video camera 30, a program $P_3$ loaded into the control unit 40 for example, for interpreting the images issuing from the video camera 30.

The program $P_3$ makes it possible to measure the external dimensions of the card as well as the size and position of the elements on the surface of the card which must not be printed.

The computer-aided vision device makes it possible for example to measure the location of the electronic micromodule which includes a chip for a smart card, the magnetic strip for a magnetic card, etc.

One or more heads $T_1$-Tq are disposed above the cards Cp which follow one another on the support 60. The ink-jet heads are aligned along the axis of movement of the cards above said cards.

In order to improve the speeds of the plastic card type medium printing machines while ensuring that the printing is of good quality, it is also proposed to use an optical fibre F1-Fq after each print head for applying radiation issuing from a source SL capable of starting the cross-linking, that is to say converting the drops of ink into gel and thus preventing osmosis of the coloured inks, the cross-linking being carried out at the end of the printing line by a radiation device for example a UV radiation device providing radiation more powerful than that of the fibres.

The use of fibres as just described also makes it possible to control the dimension of the drops since, by gelling them (converting into gel), their spreading is stopped.

The printing machine has a second camera 50 so as to carry out, by means of the computer-aided vision system, a check on the quality of the printing which has been carried out on the cards. To that end, the unit 40 has a program $P_5$ for analysing the images A taken by the camera 50. This program is capable of analysing the colours, ink marks and any scratches and of controlling the ejection of cards considered defective and/or of modifying the ink-jet printing parameters in order to correct any calorimetric drift for example.

And finally, the radiation device 70, preferentially a UV (ultraviolet) radiation lamp for the ink used for printing on plastic, makes it possible to cross-link the ink, that is to say cause a rapid conversion from the liquid or gel state to the solid state.

The cards next fall into a recovery bin 80.

In the case of double-sided printing, the machine is equipped with a device for turning over the cards 90.

This device has for example a flap in the recovery bin 80, the opening of which is controlled by the unit 40 which sends a control signal R to that end. It also has a mechanism for turning over the card with recovery in a second feed bin 10B.

The printing can be performed in one or a number of passes depending on the types of ink-jet head used.

When the cards are printed, they can undergo varnishing which consists of depositing, by ink jet, a layer of finishing material (varnish) which can have a protective and/or aesthetic function. The varnishing can be performed by a head reserved to that end for example.

By means of the invention, it is possible to deposit and rapidly cross-link drops of varnish selectively on a printed surface. If need be, the printed surface can be levelled by depositing exactly the number of drops of varnish necessary since the processing is digital.

Figure 2:
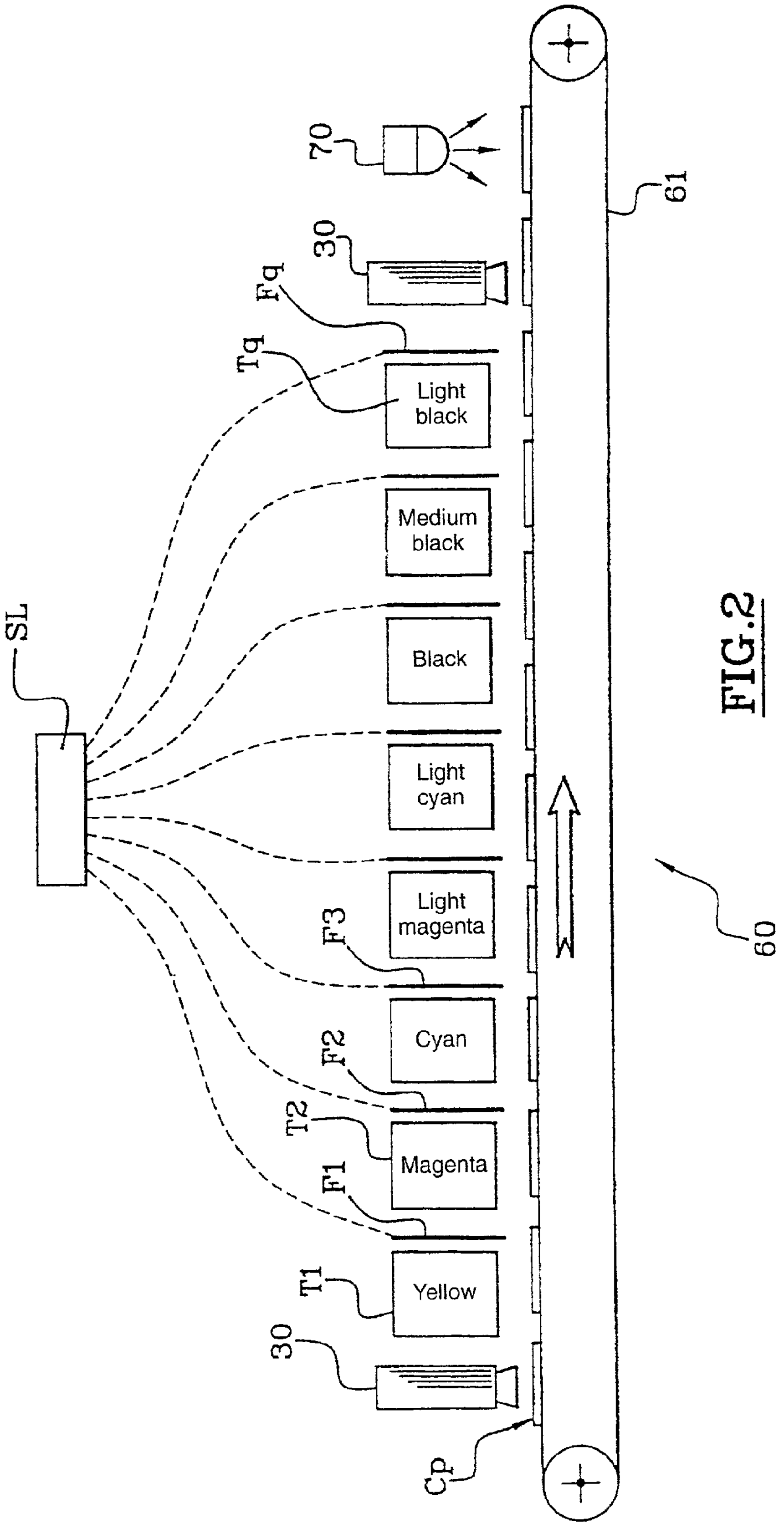
FIG. 2 depicts schematically an ink-jet printing machine according to a first embodiment of the invention.

FIG. 2 illustrates in a non-detailed and incomplete manner an ink-jet printing machine according to a first embodiment.

According to this first embodiment, the support element 60 for the cards comes in the form of a conveyor 61 which makes it possible to make the cards Cp which are placed on the conveyor travel in front of a number of print heads.

This embodiment illustrates a case where the machine has 8 ink-jet heads. According to the example illustrated, the machine has heads corresponding to the 4 primary colours and other colours such as orange, light cyan, or varnishes of specific colour (spot colour). These print heads make it possible to print photographic or coloured images.

The machine also has a monochrome (black) head for printing for example texts, bar codes or other items.

The heads have a resolution of 600 dpi with 1,536 jets per head, using inks cross-linked by UV. The control unit (not depicted) is capable of controlling the whole line so as to obtain 20,000 printed cards (faces) per hour. The conveyor has a length, for example, of between 4 and 5 meters. The printing is carried out in a single pass.

Figure 3:
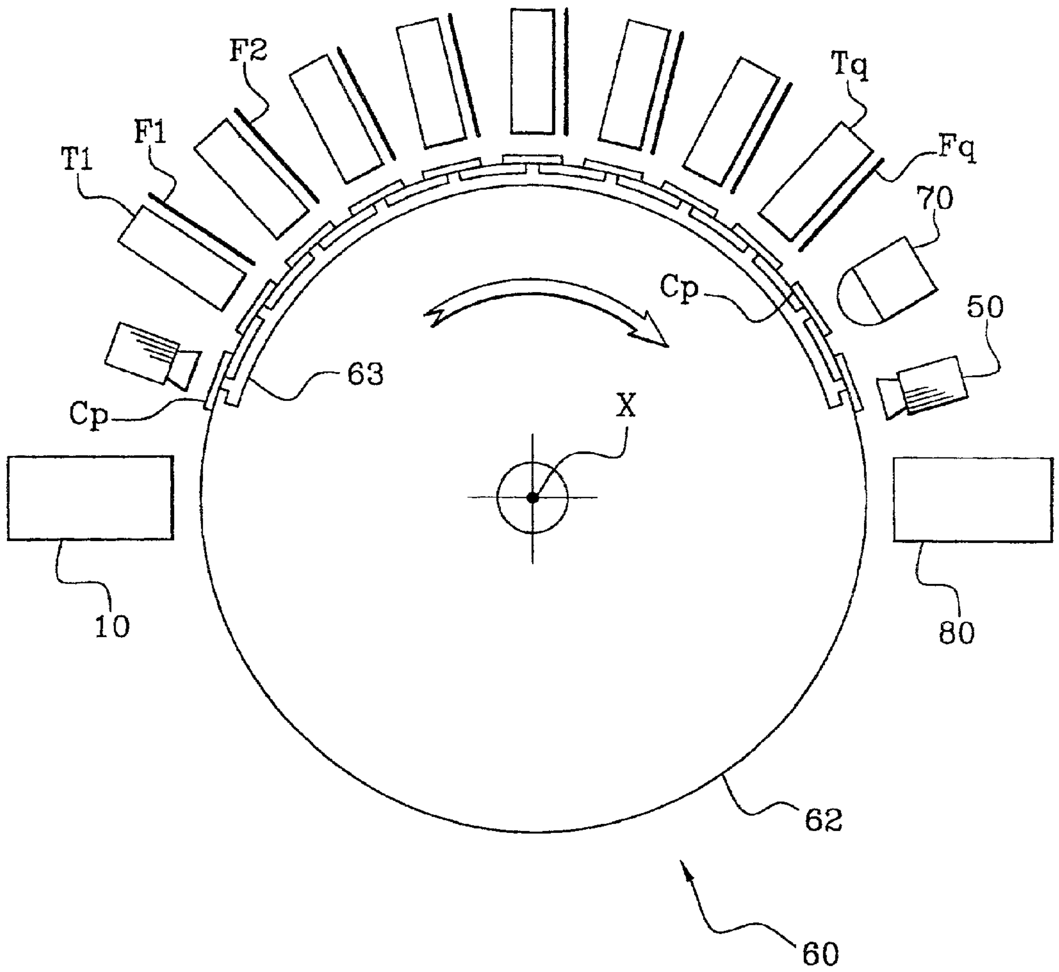
FIG. 3 depicts schematically a printing machine according to a second embodiment of the invention.

FIG. 3 illustrates in a non-detailed and incomplete manner a printing machine according to a second embodiment, particularly adapted to printing in a number of passes.

In this embodiment, the support 60 is composed of a drum 62 which can turn around its axis X. The cards are disposed on the surface of the drum. A suction device 63 will be provided inside the drum 62 in order to hold the cards Cp stuck to the surface of the drum, said surface being perforated in order to allow suction under the cards.

As an example, the drum is 1.2 meters in diameter, 36 cards can be disposed and each of them printed in 6 revolutions.

8 heads are used with 256 jets per head using inks cross-linked by UV and having a resolution of 600 dpi. It is possible with this solution to print 6,000 cards per hour. By means of the invention, it is possible to achieve graphic printing having a dot density greater than 400 dpi and preferably greater than or equal to 600 dpi.

The printing of each card in a number of passes can be carried out either by moving the drum with respect to the heads or by moving the heads with respect to the drum.

The control unit 40 has as its main function the management of the monochrome or colour ink-jet heads in order to reproduce the design or designs to be printed, taking into account the information coming from electrical reading of the card (if necessary), non-printable areas (card margin, micromodule, magnetic strip) and calorimetric corrections of the inks used.

At the input of the line, there can also be provided a system allowing cleaning of the cards, an air jet for example which would blow air over the cards which will thus be ready to be printed.

In order to gel the ink on the surface without deep cross-linking, action is taken preferably on a UV wavelength modulation. A superficial skin on the ink or a surface cross-linking is then obtained. In particular, means of emitting UVC type radiation can be used. For deep cross-linking of non-cationic inks at the end of printing, UVA type radiation is used.

Among printing flaws or drifts checked by the invention are, for example, non-printed lines or those printed with different colours compared to the original. The diagnosis made by the analysis program can for example be a nozzle problem which it is then necessary to flush out or clean automatically.

There can also be calorimetric drifts compared with a pre-recorded reference model. The analysis program can have a definition of an acceptance model for a signal resulting from an image analysis which is compared at regular intervals with a received signal corresponding to a given analysis. The printing machine can comprise means capable of implementing a number of types of analysis requiring algorithms known to persons skilled in the art and corresponding to sub-programs of a main analysis program. The various analyses can be carried out in turn or simultaneously and if need be implemented by multitasking or parallel input and processing means associated with CAV devices.

An analysis can be made, for example, of the absence or presence of printing at given points, the concentration of printed pixels or level of correlation between a theoretical model and the model actually printed, the presence of scratches by detecting a continuous number of unprinted dots, or the calorimetric drift. The main program can activate signals acting notably on head printing parameters such as the excitation time or voltage, the operating temperature (influencing the viscosity of the ink), or the pixel distribution.

As the card geometry, the magnetic strips and the modules are variable as a result of manufacturing tolerances and the tolerance permitted notably by ISO standards 7810 and 7811, or their position on the transportation system, the importance of the invention having a system of geometric location of the card by a C.A.V. system comprising one or more video cameras can be understood. Thus, for example, printing at undesired places such as the module, the transportation system, etc. is avoided.

The advantage of piezoelectric type ink-jet heads is the ability to accept different kinds of high viscosity inks and to operate at a high frequency.

By means of the invention, it is possible to perform accurate varnishing with a layer of finishing material over the whole or part of the surface of the medium. The finishing material can extend as far as the margins of the medium without overlapping the medium transportation system or even without overflowing on to the edge of the medium.

The invention claimed is:

1. A machine for graphic printing on at least one card medium, comprising:

at least one ink-jet head;

a computer-aided vision device having at least one video camera for dynamic discrimination between areas on a surface of the card medium in which printing is to be performed and areas in which printing is not to be performed; and means for controlling the head to implement ink-jet printing on the areas of the card medium in which printing is to be performed, in accordance with information provided by said video camera.

2. A machine according to claim 1, wherein the card medium is made of plastic, and the inks used are capable of being cross-linked by radiation.

3. A machine according to claim 1, wherein said card medium is made of cardboard or paper, and the inks used are aqueous, phase-change or solvent-based.

4. A machine according to claim 1, wherein the card medium comprises a storage card, and said machine further includes a reader that reads information contained in the card, and communicates this information to the control means.

5. A machine according to claim 4, wherein the information read by the reader comprises information to be printed on the storage card by means of the machine.

6. A machine according to claim 1, further including a support element for receiving a plurality of cards to be printed and transporting said cards past the head of the machine for continuous printing.

7. A machine according to claim 6, wherein the support element comprises a flat conveyor.

8. A machine according to claim 6 wherein the support element comprises a drum.

9. A machine according to claim 6, wherein the support element is perforated, and includes a suction device to hold the cards while it is moving.

10. A machine according to claim 6, comprising a number of print heads aligned along the direction of movement of the support element and facing said support element, at least one of which is a colour print head for printing images of the photographic or coloured type.

11. A machine according to claim 10, wherein another one of said print heads is a monochrome head for marking the card medium.

12. A machine according to claim 1, further including a system for turning over the cards for double-sided printing.

13. A machine according to claim 1, further including means for converting the ink into gel during printing by wavelength modulation, at a distance from the card.

14. A machine according to claim 13, wherein said means for converting the ink into gel comprise an optical fibre placed after each print head, connected to a light radiation source that emits UVC radiation.

15. A machine according to claim 1, further including means for cross-linking the ink at the end of printing.

16. A machine according to claim 15, wherein said cross-linking is performed by means of an ultraviolet lamp.

17. A machine according to claim 1, further including means for printing finishing material such as varnish, by ink jet, in accordance with geometric and/or positioning parameters of the card to be printed.

18. A machine according to claim 1, wherein said control means controls the print head to print in accordance with geometric and/or positioning parameters extracted beforehand from each card to be printed.

19. A machine for graphic printing on at least one storage card, comprising:

at least one ink-jet head;

a computer-aided vision device having at least one video camera for dynamic measurement of geometric and/or positioning parameters of the storage card;

a reader that reads information contained in the card that is to be printed on the storage card by means of the machine; and means for controlling the head to implement ink-jet printing on the card medium in accordance with the geometric and/or positioning parameters provided by said video camera and the information read by the reader.

20. A machine for graphic printing on at least one storage card, comprising:

at least one ink-jet head;

a computer-aided version device having a sensor for dynamically detecting the position of at least one feature of the storage card; and a controller that determines at least one area in which printing is not to be performed on the basis of said detected position, and controls said ink-jet head to print graphics on said storage card away from said determined area.

21. The machine of claim 20, wherein said feature comprises an element in the storage card over which printing is not to be performed.

22. The machine of claim 20, wherein said feature comprises the external dimensions of the storage card.

23. The machine of claim 20, wherein said sensor comprises a video camera.

* * * * *